United States Patent
Rozario et al.

(10) Patent No.: US 6,253,262 B1
(45) Date of Patent: *Jun. 26, 2001

(54) ARBITRATING FIFO IMPLEMENTATION WHICH POSITIONS INPUT REQUEST IN A BUFFER ACCORDING TO ITS STATUS

(75) Inventors: Ranjit J. Rozario, San Jose; Scott Waldron, Belmont; Ravikrishna Cherukuri, Milpitas, all of CA (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/151,862

(22) Filed: Sep. 11, 1998

(51) Int. Cl.[7] .................................................. G06F 13/18
(52) U.S. Cl. ................................ 710/39; 710/40; 710/54; 710/244; 711/158
(58) Field of Search ................................ 710/41, 42, 43, 710/52, 53, 54, 56, 240, 241, 244, 39, 40; 711/150, 151, 158, 169; 712/218

(56) References Cited

U.S. PATENT DOCUMENTS

| 4,558,429 | 12/1985 | Barlow et al. ........................ 711/157 |
| 4,899,307 | * 2/1990 | Lenoski ................................... 365/78 |
| 5,072,420 | 12/1991 | Conley et al. .......................... 710/57 |
| 5,220,653 | * 6/1993 | Miro ..................................... 709/107 |
| 5,226,126 | 7/1993 | McFarland et al. .................. 712/218 |
| 5,375,223 | * 12/1994 | Meyers et al. ........................ 711/151 |
| 5,406,554 | 4/1995 | Parry ..................................... 370/381 |

(List continued on next page.)

OTHER PUBLICATIONS

*AGP Accelerated Graphics Port*, "Accelerated Graphics Port Interface Specification", Revision 2.0, Intel Corporation, May 4, 1998.

Accelerated Graphics Port/Tutorial, one page; Chapter 1, three pages; Chapter 2, two pages; Chapter 3, one page; Chapter 4, one page; Chapter 4, one page; Chapter 5, one page; Chapter 6, three pages. Found on http://www.intel.com/technology/agp/tutorial/index,htm, dated Jul. 29, 1998.

*Primary Examiner*—Do Hyun Yoo
*Assistant Examiner*—Gary J. Portka
(74) *Attorney, Agent, or Firm*—Eschweiler & Associates, LLC

(57) ABSTRACT

A system (100) for automatically ordering a request for access to a system memory (14) is disclosed. The system (100) includes a re-ordering buffer (102) having a data input (120) and a data output (122) and an input request position identifier (104) associated with the re-ordering buffer (102). The input request position identifier (104) indicates a position of the data input (120) in the re-ordering buffer (102) for the new request based on a status of the request. A method (230) of ordering a request for access to a system memory (14) in a buffer (102) is also disclosed and includes initiating a request (232) for access to the system memory (14), wherein the request contains a status indicating a priority of the request. The status of the request is evaluated (234) to determine whether the request is a high priority request or a low priority request and a location for inputting the access request into the buffer (102) is identified (236) in response to the evaluation. One or more previously requested access requests are then shifted (240) within the buffer if necessary to make room for the access request at the identified location and the new access request is inserted into the buffer at the identified location (242).

23 Claims, 6 Drawing Sheets

U.S. PATENT DOCUMENTS

| | | | |
|---|---|---|---|
| 5,485,586 | 1/1996 | Brash et al. | 710/112 |
| 5,568,443 | 10/1996 | Dixon et al. | 365/230.05 |
| 5,615,350 | 3/1997 | Hesson et al. | 712/218 |
| 5,673,416 | 9/1997 | Chee et al. | 345/535 |
| 5,727,177 | 3/1998 | McMinn et al. | 712/218 |
| 5,737,629 | 4/1998 | Zuraski, Jr. et al. | 712/23 |
| 5,809,278 | 9/1998 | Watanabe et al. | 711/150 |
| 5,832,297 * | 11/1998 | Ramagopal et al. | 710/5 |
| 5,903,776 | 5/1999 | Larson | 710/54 |
| 6,000,001 * | 12/1999 | Larson | 710/244 |
| 6,047,334 | 4/2000 | Langendorf et al. | 710/5 |

\* cited by examiner

ARBITRATING FIFO IMPLEMENTATION WHICH POSITIONS INPUT REQUEST IN A BUFFER ACCORDING TO ITS STATUS

TECHNICAL FIELD OF THE INVENTION

The present invention relates generally to a graphics processing system and more particularly relates to a system and method for ordering a request for access to a system memory using a re-ordering buffer or FIFO.

BACKGROUND OF THE INVENTION

Computer applications are continuously being developed and many of these application are utilizing three dimensional (3-D) graphics. Providing the necessary lifelike 3-D graphics requires a continuous series of processor-intensive geometry calculations which delineate the position of an object in 3-D space. Generally, such calculations are performed by a system processor which is capable of executing the necessary floating point operations. Simultaneously, a graphics controller must process texture data in order to generate surfaces and shadows to make the object appear three dimensional. One important aspect of processing the texture data is the processing of texture maps, which are bit maps that describe the surfaces of the objects.

Texture map processing may include the retrieval of texels (e.g., texture elements) from a bit map, averaging the texels together based on a mathematical approximation of the location of the object which is needed in the image to generate data constituting a pixel, and writing the resulting pixel data as a frame to a local memory such as a frame buffer. The processing of texture maps was previously provided in a computer system 10 as illustrated in prior art FIG. 1 and involved five basic steps.

At Step 1, texture maps are read from a memory 12 such as a hard drive or disk drive into a system memory 14 via a bus 16 (such as a PCI bus) and a logic chip 18 (often called the core logic). When the texture map is to be used in Step 2, it is read from the system memory 14 into a CPU 20 which executes point-of-view type transformations on the texture map data and stores the results in cache. In Step 3, additional transforms, such as lighting and view point transforms, are applied to the cached texture map data and subsequently written back to the system memory 14. At Step 4, a graphics controller 22 reads the transformed texture data from the system memory 14 and writes it to a local video memory 24 such as a frame buffer over the PCI bus 16. At Step 5, the graphics controller 22 reads the texture data plus two dimensional color information from the frame buffer 24 and provides a frame which is written back to the frame buffer 24. The frame data is then read by a D/A converter within the graphics controller 22 to drive a display 26 with a 3-D image.

The prior art system 10 of processing texture maps has several undesirable features. First, texture data must be stored in both the system memory 14 and the frame buffer 24, thus resulting in redundant copies of the texture data and an inefficient utilization of memory resources. Second, the storing of the texture data in the frame buffer 24 limits the size of the texture data which is undesirable since demand is growing for more highly detailed textures which necessitates an expensive increase in the size of the frame buffer memory. Lastly, the bandwidth of the PCI bus 16 is limited to 132 Mbytes/second which limits the rate at which the texture map data can be transferred from the system memory 14 to the graphics controller 22. In addition, since various subsystems also utilize the PCI bus 16, the transfer of texture data must share the available PCI bandwidth, thus further limiting the 3-D graphics performance.

To address the above concerns with 3-D graphics performance, the PC platform now includes an accelerated graphics port (AGP) architecture. AGP relieves the above-described graphics bottleneck by adding a dedicated, high speed bus 30 between the core logic 18 and the graphics controller 22, as illustrated in the system 32 of prior art FIG. 2. The addition of the AGP bus 30 removes the bandwidth intensive 3-D and video traffic from the limitations of the PCI bus 16. In addition, AGP allows the texture data to be accessed directly by the graphics controller 22 from the system memory 14 rather than being prefetched to the frame buffer 24, thus requiring fewer texture maps to be stored in the local memory and eliminating the size constraints on the texture data.

In addition to the above benefits, the AGP bus 30 supports a data transfer rate of 533 Mbytes/second as opposed to 132 Mbytes/second by using both the rising and falling edges of the clock and managing the data transfer more efficiently. Furthermore, the texture data in the system memory 14 is dynamically allocated which enables the graphics controller 22 to see a virtual continuous space in the system memory 14 when in fact the pages are disjointed. This allocation allows the graphics controller 22 to access the texture data more efficiently. Consequently, AGP has been widely adopted and greatly improves the 3-D graphics performance.

The ordering rules for the processing of requests by the graphics controller in AGP differ from the CPU and PCI ordering rules. AGP supports two levels of access priority: high priority and low priority. For high priority requests, write and read requests are ordered separately. Consequently, the ordering of high priority read requests are made only with respect to other high priority read requests. Similarly, the ordering of high priority write requests are made only with respect to other high priority write requests and high priority read and write requests are handled independently. Low priority requests, however, are handled differently than the high priority requests. For low priority transactions, there is a relationship between read and write requests; particularly, write data is allowed to pass previously queued low priority read requests (e.g., read requests "push" write requests).

In order to implement the above AGP ordering rules, four separate queues are utilized in the control logic, wherein the queues store the high priority read requests, high priority write requests, low priority read requests and low priority write requests, respectively, as illustrated in prior art FIG. 3. As illustrated in prior art FIG. 3, the core logic 18 includes four separate access request queues 32, 34, 36 and 38, respectively. New access requests are stored in the appropriate queue according to its status (i.e., whether a read or a write request and whether the request is a high priority or a low priority request). Each queue 32, 34, 36 and 38 outputs its associated access request to an arbitration circuit 40 its earliest request, respectively (each queue operating as a first-in, first-out (FIFO) memory) and the arbitration circuit 40 uses the above-discussed ordering rules to select the proper access request. The post-queue arbitration methodology, however, results in an extra clock cycle of latency which degrades the performance of the 3-D data transfers.

It would be desirable to implement the AGP ordering rules without the disadvantages of the prior art.

SUMMARY OF THE INVENTION

The present invention is directed to a system for automatically ordering a request for access to a system memory.

The system includes a re-ordering buffer and a set of pointers which identify the location for entry of a new access request based on whether the request is a high priority or a low priority request. Therefore arbitration of access requests is dynamically performed while being queued in a single buffer instead of having multiple queues for different priorities and performing arbitration after requests are enqueued as in the prior art. The present invention thus eliminates an extra buffer, saves silicon space and eliminates a clock cycle of latency due to the elimination of the post-queue arbitration logic.

According to one aspect of the present invention, the re-ordering buffer or FIFO has a data input and a data output. Associated with the re-ordering buffer are a set of pointers, a high priority pointer and a low priority pointer, which indicates the appropriate input position within the buffer for high priority and low priority access requests, respectively. For a new high priority access request, the low priority access requests already residing within the re-ordering buffer shift to allow room for entry of the request. The new high priority request will then be executed after earlier requested high priority requests are executed and before any low priority requests are executed. Therefore the buffer is dynamically re-ordered based on the priority of the new access request, thus effectively arbitrating between access requests before they are queued in the buffer. Consequently, the need for post-buffer arbitration logic is eliminated.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages, and novel features of the invention will become apparent from the following detailed description of the invention when considered in conjunction with the drawings.

DETAILED DESCRIPTION OF THE INVENTION

Figure 1:
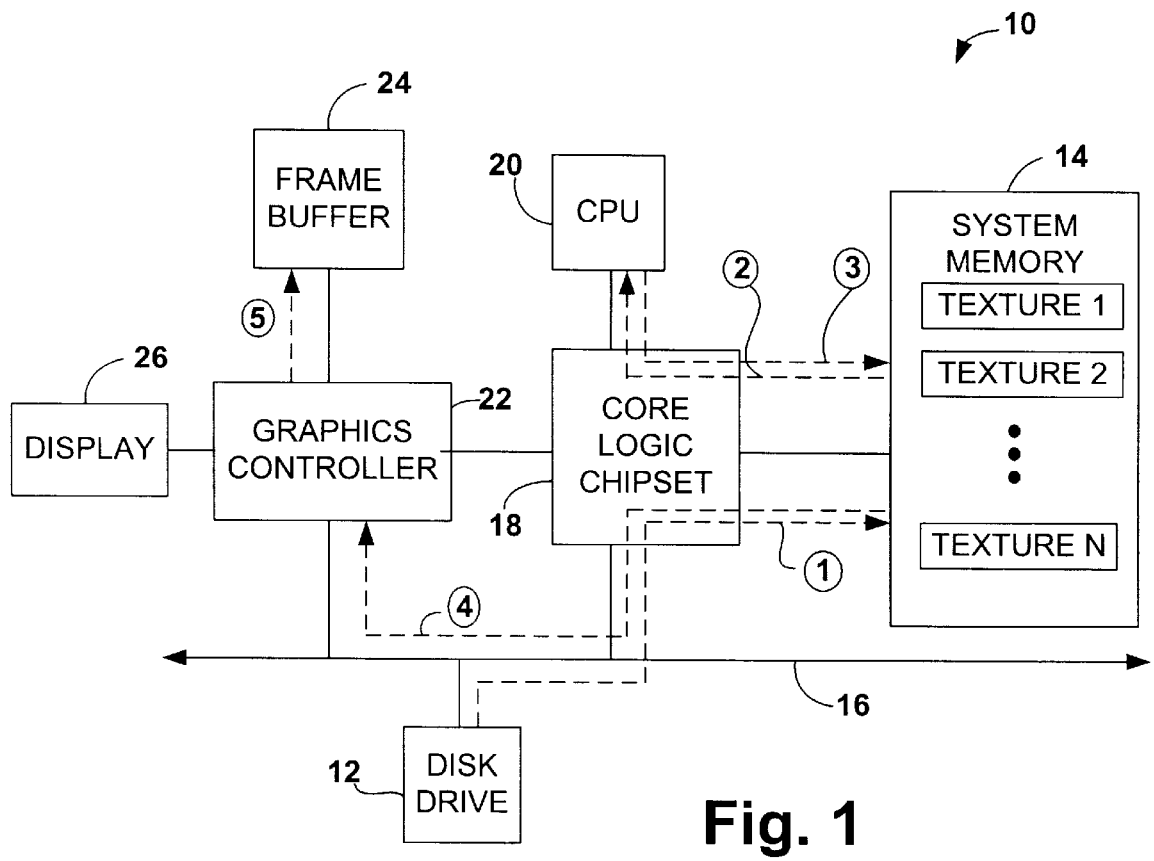
FIG. 1 is a block diagram illustrating a prior art traditional computer platform and a procedure for transferring texture data from a system memory to a frame buffer for three dimensional graphics capability.
Figure 2:
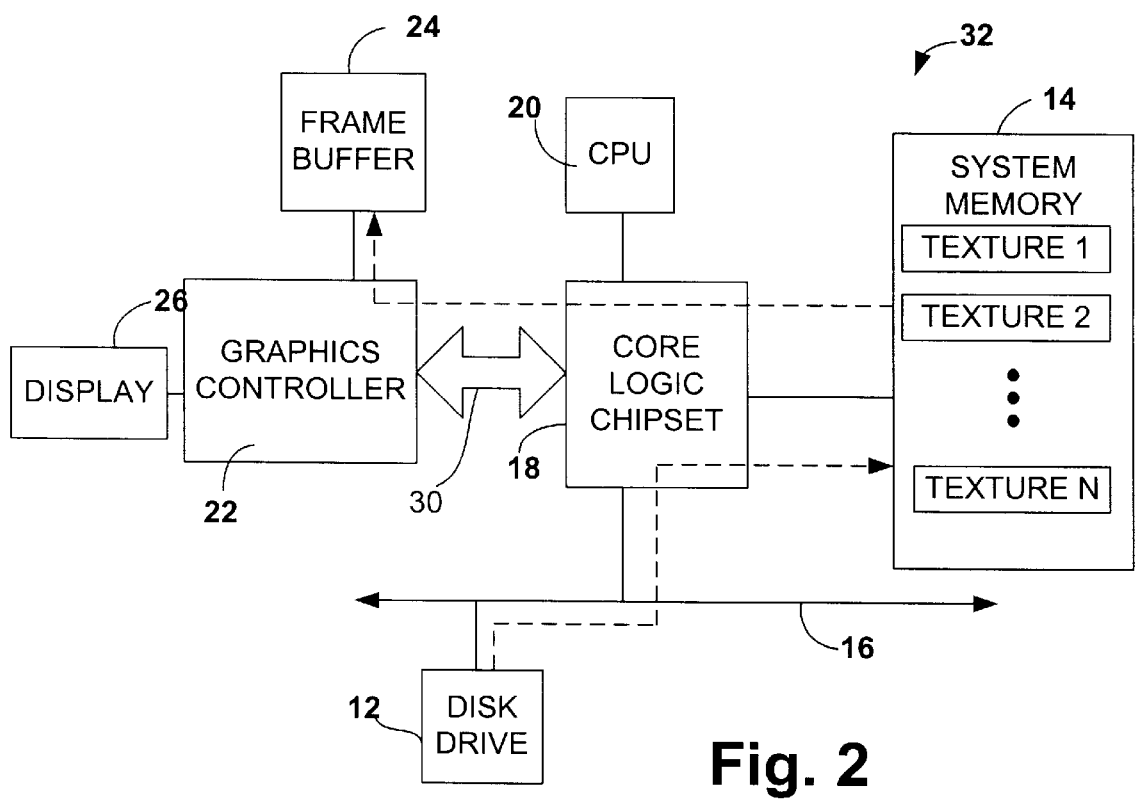
FIG. 2 is a block diagram illustrating a prior art accelerated graphics port computer platform and a procedure for transferring texture data from a system memory to a frame buffer for three dimensional graphics capability.

The following is a detailed description of the present invention made in conjunction with the attached Figures, wherein like reference numerals will refer to like elements throughout.

Figure 4:
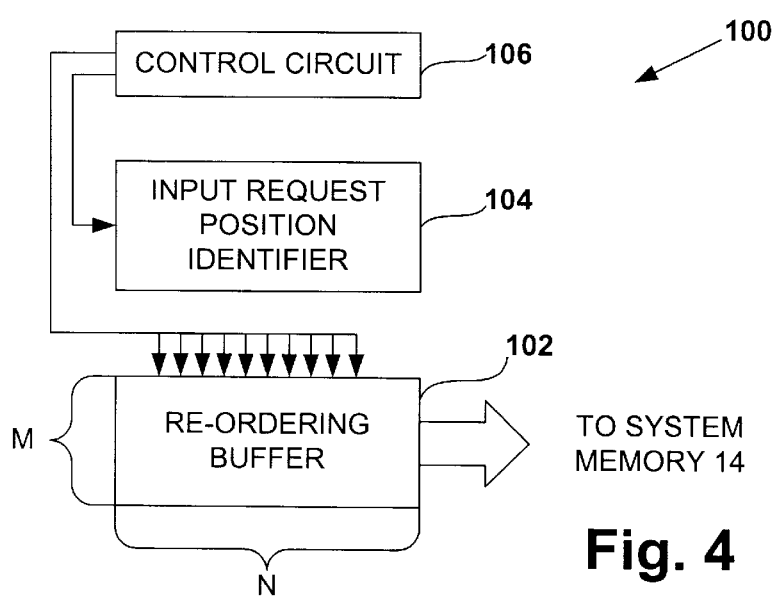
FIG. 4 is a block diagram illustrating a system for ordering a request for access to a system memory according to the present invention.

Turning now to the Figures, FIG. 4 is a block diagram illustrating a system 100 for re-ordering a request queue in response to a new access request to system memory. The system 100 includes a re-ordering buffer 102 having a plurality of entries (N) wherein each entry is M bytes wide. The buffer 102 stores requests for access to the system memory which originate from the graphics controller 22. For example, an access request may be a request to retrieve one or more pieces of texture data from the system memory (i.e., a read request and thus the buffer 102 is a read buffer). Alternatively, an access request may be a request to transfer one or more pieces of texture data to the system memory (i.e., a write request and thus the buffer 102 is a write buffer). An input request position identifier 104 is associated with the buffer 102 and indicates the proper location within the buffer 102 for entry of a new access request. The request position identifier 104 identifies the entry position within the buffer 102 based on the priority of the access request. Preferably, the system 100 operates with two priorities, high priority and low priority access requests. Alternatively, however, a greater number of priorities may be used and such configurations are contemplated as falling within the scope of the present invention.

Figure 3:
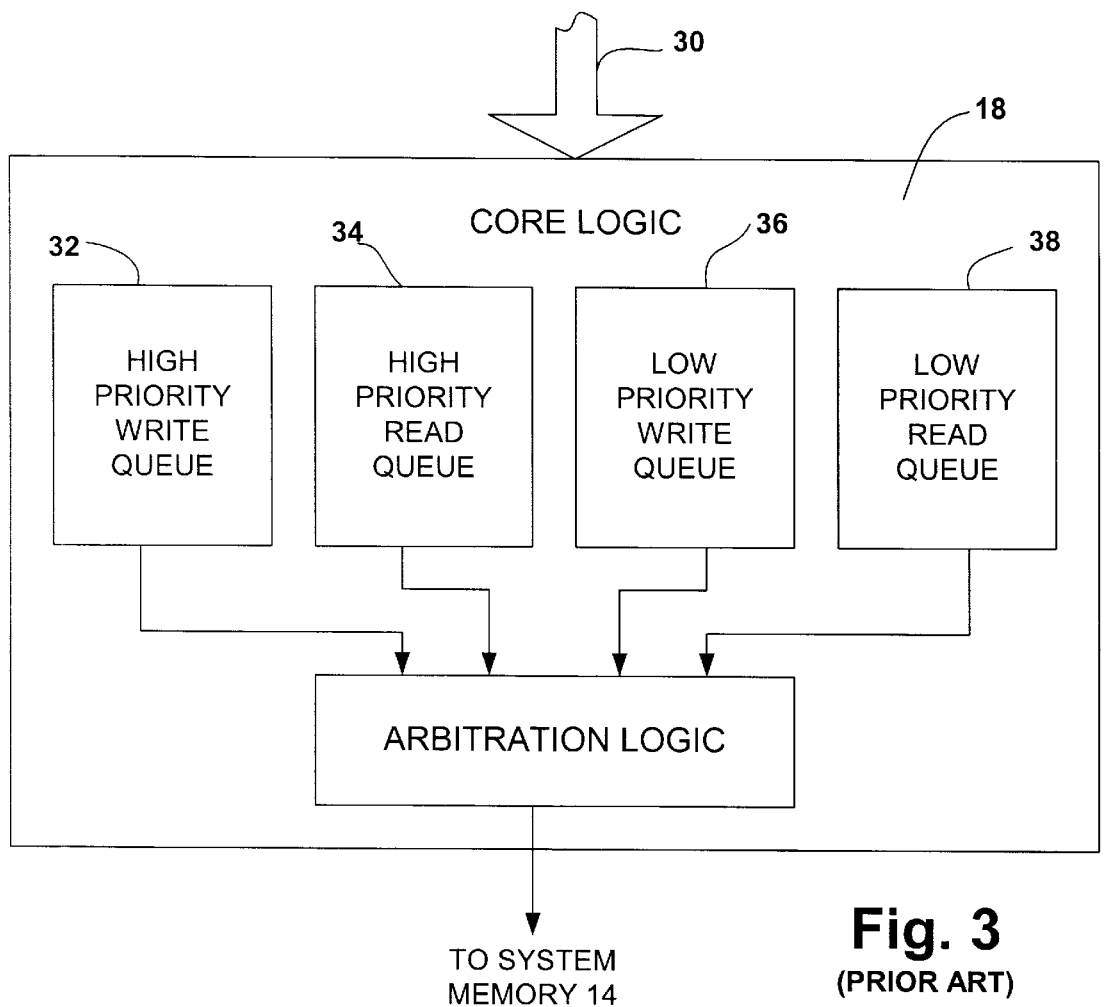
FIG. 3 is a block diagram illustrating a prior art access request queuing system using multiple queues and an arbitrating circuit for ordering read and write access requests having differing priorities.

A control circuit 106 is coupled to both the buffer 102 and the request position identifier 104. The control circuit 106 provides an indication of whether a new access request is to be written to the buffer 102 or whether the request at a buffer output is to be read from the buffer 102. In addition, the control circuit 106 provides an indication of the priority of the access request when a new request is to be written to the buffer 102. Based on the priority of the new access request, the request position identifier 104 indicates the proper input position within the buffer 102. Preferably, the request position identifier 104 is a pair of pointers which point to the position where the last access request was input for each priority, respectively. Alternatively, however, other mechanisms for tracking the proper input positions within the buffer 102 may be utilized and are contemplated as falling within the scope of the present invention. For example, the request position identifier 104 may be one or more counters which increment or decrement as access requests are written to and read from the buffer 102. Lastly, the control circuit 106 transfers the new access requests to input positions in the buffer 102 based on the information provided by the request position identifier 104. Therefore the system 100 orders new access requests as they enter the buffer 102 which eliminates the need for post-queue priority arbitration logic for read and/or write requests, respectively. In addition, incorporating all read requests into a single buffer and all write requests within a single buffer reduces the four (4) queue system of prior art FIG. 3 to reduce down to two buffers, wherein a single buffer exists for read access requests and another buffer exists for write access requests, thus saving silicon area.

The buffer 102 behaves generally as a first-in, first-out (FIFO) memory. That is, the access requests which are first entered or queued into the buffer 102 get executed first. Thus no post-queue priority arbitration need be performed. The buffer 102 differs slightly from standard FIFOs because a new access request to the buffer 102 may cause a re-ordering of the requests already residing within the buffer 102 depending on the priority of the new access request. For example, if a new access request is a low priority request, the control circuit 106 indicates that a low priority request will be transferred to the buffer 102 and looks to the input request position identifier 104 to determine the appropriate input position for the low priority request, which will be behind the most recently transferred low priority access request. Since the access request is a low priority request, no re-ordering of the buffer 102 is necessary.

Alternatively, if a new access request is a high priority request, the control circuit 106 indicates that a high priority request will be transferred to the buffer 102 and looks to the input request position identifier 104 to determine the appropriate input position for the high priority request. Because the new access request is a high priority request, it will be sent to the buffer 102 at a position which is after the most recently transferred high priority request, but before all the low priority requests regardless of how long the low priority requests have been queued. Thus the present invention performs a pre-queue type arbitration by determining the appropriate location within the buffer 102 for the new access request based upon its priority.

Figure 5:
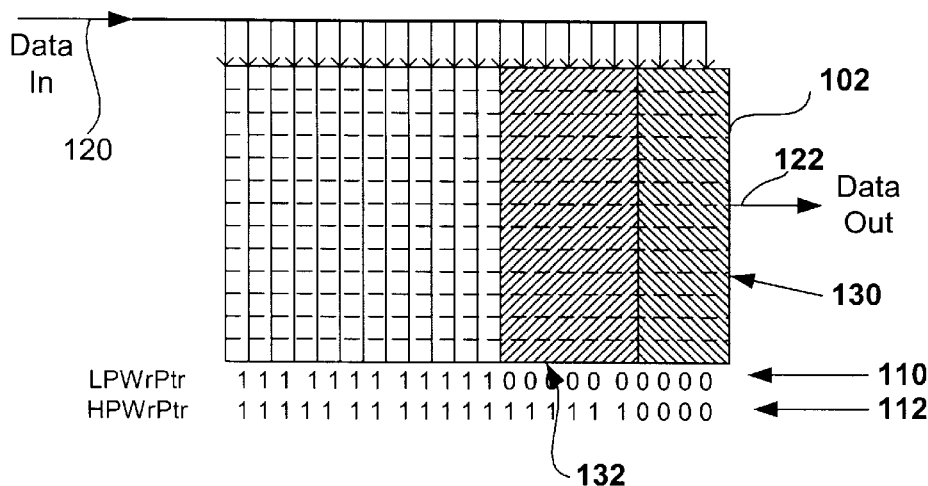
FIG. 5 is a block diagram illustrating a re-ordering buffer or FIFO and an associated set of pointers according to the present invention.

FIG. 5 is block level diagram which illustrates in greater detail the manner in which the buffer 102 operates and how a set of pointers 110 and 112 may be utilized to implement the request position identifier 104 of FIG. 4 to indicate the position for new access request transfers to the buffer 102. The buffer 102 includes a data input 120 having an input position which depends upon the priority of the access request and the present status of the buffer 102. The buffer 102 also includes a data output 122 where the access requests exit the buffer 102 for execution. The buffer 102 further includes a high priority portion 130 consisting of one or more pending high priority access requests. The high priority portion 130 exists only when all the high priority requests have not yet been executed. Similarly, the buffer 102 includes a low priority portion 132 consisting of one or more pending low priority access requests and the low priority portion 132 exists only when all the low priority requests have not yet been executed.

The pointers 110 and 112 of FIG. 5 are a low priority write pointer (LPWrPtr) and a high priority write pointer (HPWrPtr), respectively. Consequently, the buffer 102 of FIG. 5 according to this exemplary embodiment, is a write buffer which contains requests to write texture data to the system memory. Alternatively, however, the present invention is equally applicable to a read buffer which is also contemplated as falling within the scope of the present invention. The pointers 110 and 112 preferably behave as shift registers wherein a binary value is shift in from the right resulting in a plurality of bytes (i.e., words), the value of which are indicative of the position of the high priority portion 130 and the low priority portion 132 within the buffer 102.

For example, at system reset all the bytes in the shift registers are set to a high binary value (e.g., "111 . . . 1"). Each time a high priority access request gets written to the buffer 102, both pointers 110 and 112 get a low binary value (e.g., a "0") shifted in from the right (e.g., "111 . . . 0"). Therefore when the next access request is to be written to the buffer 102, the pointers 110 and 112 will indicate the position within the buffer 102 for the request. In contrast, when a low priority access request is written to the buffer 102, the low priority right pointer 110 (LPWrPtr) shifts a low binary value in from the right, and the high priority right pointer 112 does not change. Thus the shifting dynamics of the pointers 110 and 112 differ to properly reflect the appropriate input positions for new access requests based on the priority of the new access requests.

When an access request is read out from the buffer 102, both pointers 110 and 112 shift a high binary value (e.g., a "1") in from the left. An exemplary Truth Table for the write pointer shifting is illustrated below as Table 1. In Table 1, "FifoWr" represents the status of whether or not an access request is being written to the buffer 102 (FifoWr=1 indicates a write to the buffer 102) and "FifoRd" represents the status of whether an access request is being read from the buffer 102. FifoWr and FifoRd are not necessarily the opposite of one another because the system 100 allows a write and a read to occur at the same time. Lastly, when a write is occurring (FIFOWr=1), "Pri" represents the priority of the new access request.

TABLE 1

| FifoWr | Pri | FifoRd | LPWrPtr | HPWrPtr |
|---|---|---|---|---|
| 0 | x | 0 | No Change | No Change |
| 1 | 0 | 0 | Shift Left | No Change |
| 1 | 1 | 0 | Shift Left | Shift Left |
| 0 | x | 1 | Shift Right | Shift Right |
| 1 | 0 | 1 | No Change | Shift Right |
| 1 | 1 | 1 | No Change | No Change |

Figure 6:
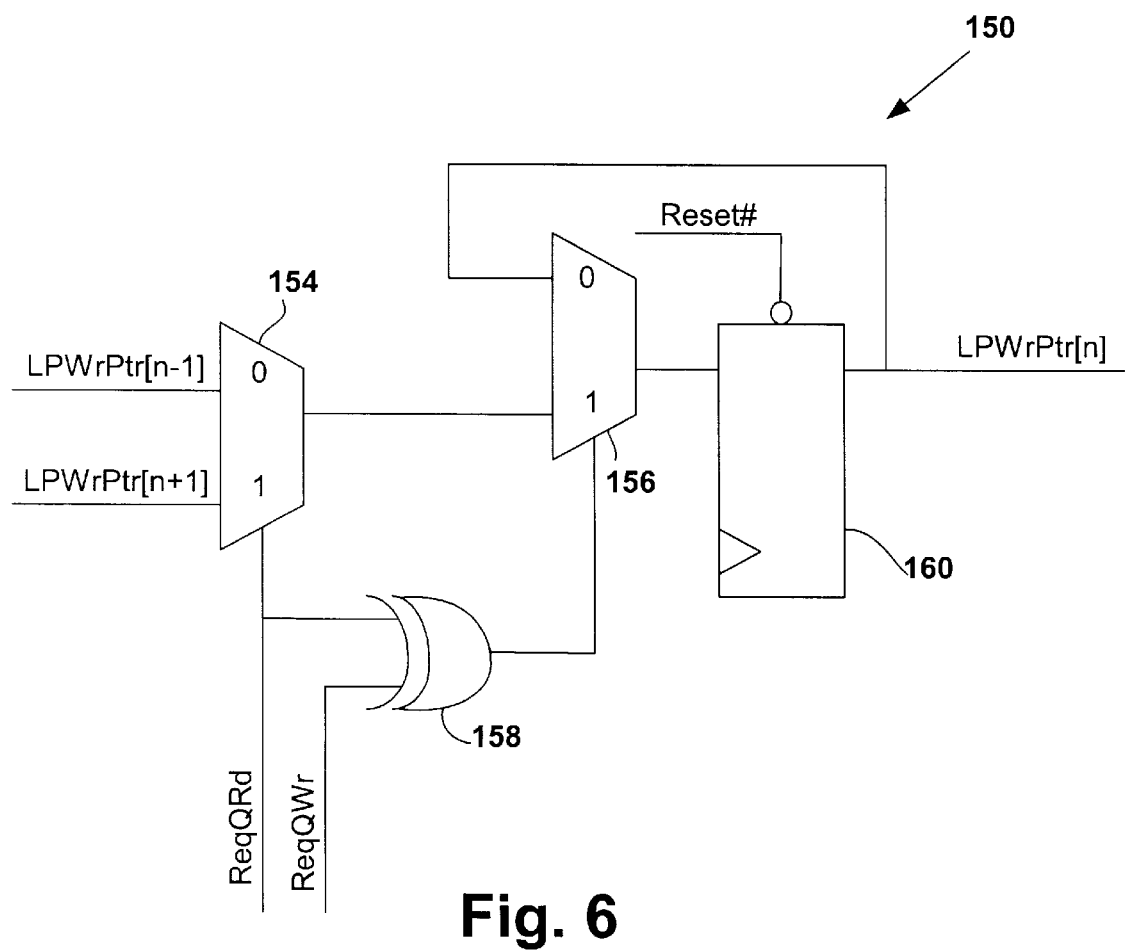
FIG. 6 is a circuit diagram illustrating a circuit for shifting a low priority pointer in response to a read operation from the buffer or a write operation to the buffer in accordance with an exemplary embodiment of the present invention.
Figure 7:
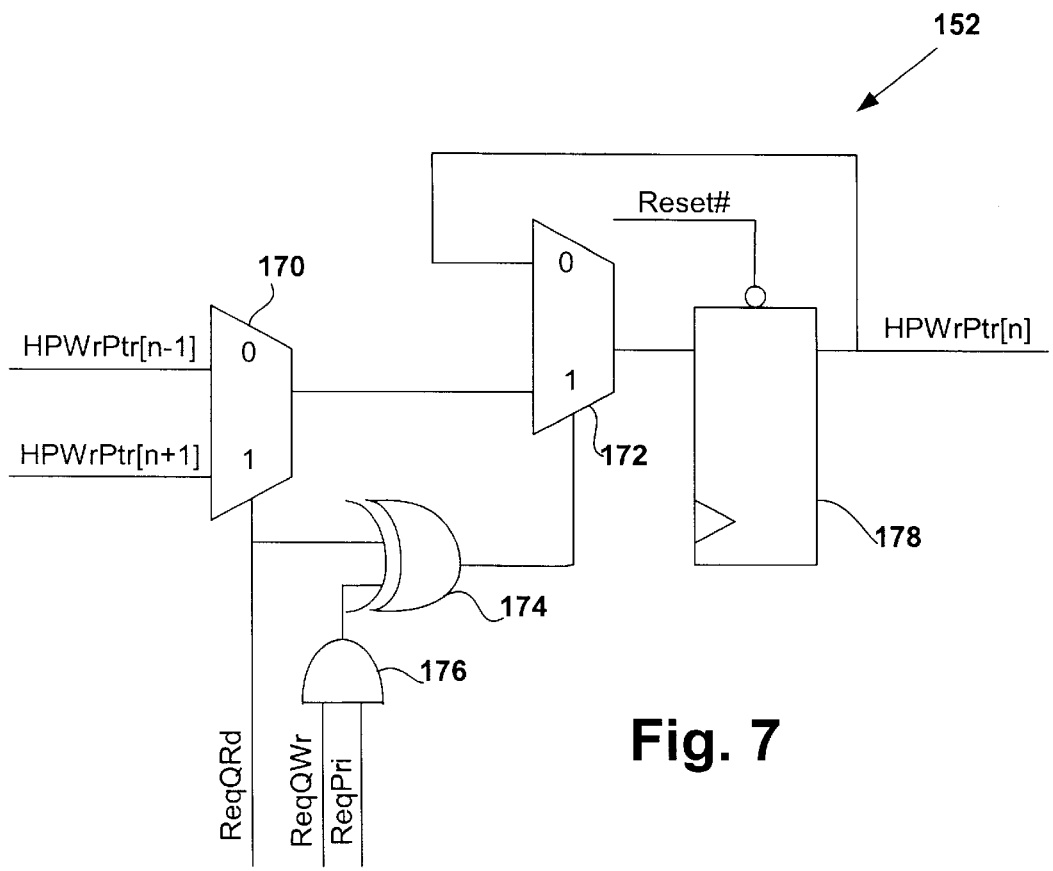
FIG. 7 is a circuit diagram illustrating a circuit for shifting a high priority pointer in response to a read operation from the buffer or a write operation to the buffer in accordance with an exemplary embodiment of the present invention.

Exemplary circuits 150 and 152 for implementing the shifting dynamics of the pointers 110 and 112 are illustrated in FIGS. 6 and 7, respectively. FIG. 6 illustrates a single cell 150 for the low priority right pointer 110. The circuit 150 represents the n$^{th}$ byte in the low priority pointer shift register with the "n+1" byte being located to its left and the "n−1" byte located to its right. The circuit 150 includes two multiplexers 154 and 156, an exclusive OR gate 158 and a D-type latch 160. The first multiplexer 154 receives as inputs the values of the neighboring shift register cells (n−1) and (n+1) and the multiplexer 154 is controlled by a control signal (ReqQRd) from the control circuit 106 of FIG. 4. When a read operation is to be performed, ReqQRd is high ("1") and is otherwise low ("0"). Thus, the multiplexer 154 passes the value of the "n−1" cell for a write operation and passes the value of "n+1" cell for a read operation, which becomes an input for the second multiplexer 156.

The second multiplexer 156 has an input which represents the value within the present cell (n) and either the value of (n+1) or (n−1) from the first multiplexer 154 depending on whether or not a read operation is being performed. The second multiplexer 156 is controlled by the output of the exclusive OR gate 158 which receives the ReqQRd signal and a ReqQWr signal as inputs. The ReqQWr signal also comes from the control circuit 106 of FIG. 4 and is high ("1") when a write operation is to be performed and is low ("0") otherwise. Due to the operation of the exclusive OR gate 158, the output of the gate 158 is low ("0") whenever neither a read nor a write operation is being performed or when both are occurring simultaneously. Otherwise, if either a read or write operation is being performed, the output of the gate 158 is high ("1"). Consequently, whenever no action is taking place (gate 158 is low "0") the second multiplexer 156 selects the value already residing in cell "n" and passes it to the latch 160. Thus the value within the $n^{th}$ cell remains the same. Likewise, if both a read and a write operation is occurring at the same time, the gate 158 is low and again the multiplexer 156 selects the value residing in cell "n" and the value stays the same.

On a macroscopic level therefore, no shifting occurs for the low priority pointer 110 when either no action occurs or when both a read and a write occur at the same time. If, however, a read or a write is occurring alone, the output of the gate 158 is high ("1") and the second multiplexer 156 outputs the value provided by the first multiplexer 154. Therefore if a read operation is occurring, the value in the "n+1" cell (i.e., the cell on the left) is selected and passed to the latch 160. Alternatively, if a write operation is being performed, then the value in the (n−1) cell (i.e., the cell on the right) is selected and passed to the latch 160. Consequently, for reads, a "1" is shifted in from the left and for writes, a "0" is shifted in from the right.

The circuit 152 of FIG. 7 is the circuit which characterizes the shifting dynamics of the high priority pointer 112 of FIG. 5. Because the high priority pointer 112 only shifts to the left for high priority write operations as opposed to the low priority pointer 110 which shifts for all types of writes independent of the priority of the write operation, the circuit 152 of FIG. 7 must take into account the priority of new access requests which are written to the buffer 102. The circuit 152 represents the $n^{th}$ cell in the high priority pointer shift register. The circuit 152 includes two multiplexers 170 and 172, an exclusive OR gate 174, an AND gate 176 and a D-type latch 178. The first multiplexer 170 operates in the same manner as the multiplexer 154 of FIG. 6, except it passes the values in the neighboring high priority pointer cells (n−1) and (n+1), respectively. The ReqQWr signal and a priority signal ReqPri are input to the AND gate 176 from the control circuit 106 of FIG. 4. The ReqPri signal is high ("1") when the new access request is a high priority request and is low ("0") when the new request is a low priority request. Because the ReqPri signal is ANDed together with the ReqQWr signal, the output of the AND gate 176 is high when a high priority write operation is to be performed and is low otherwise. This value then forms an input to the exclusive OR gate with the ReqQRd signal. The output of the exclusive OR gate 174 is thus high only if a high priority write operation is occurring or if a read operation is occurring, but not if both occur simultaneously.

The output of the exclusive OR gate 174 controls the second multiplexer 172. If either a high priority write operation or a read operation is being performed, the second multiplexer 172 passes the output of the first multiplexer 170 to the latch 178 which then becomes the value in the nth cell. Thus, if a high priority write occurs, the value in the (n−1) becomes the value in the cell "n" which is equivalent to a "0" being shifted in from the right and the value of each cell shifting to the left. Alternatively, if a read occurs, the value in cell (n+1) becomes the value in cell "n" which is equivalent to a "1" being shifted in from the left and the value of each cell being shifted to the right. If, however, neither a high priority write operation nor a read operation is being performed, the output of the exclusive OR gate 174 is low and the second multiplexer 172 outputs the value within the cell "n", which effectively results in no shifting. Although the operation of the above pointers 110 and 112 has been described in conjunction with an exemplary embodiment in FIGS. 6 and 7, other input access request position identifiers may be utilized and such alternative mechanisms and/or circuits are contemplated as falling with the scope of the present invention.

Returning to FIG. 5, the buffer 102 is preferably composed of a matrix of shifting elements that can shift data values to the left and to the right, respectively. For example, if the buffer is N entries deep and M bits wide, the number of shifting elements in the matrix is N×M. The buffer 102 holds both high priority and low priority access requests and the pointers 110 and 112 indicate the proper input position for the access request based on its priority so that arbitration of a new access request is effectively performed prior to being queued.

Each entry into the buffer 102 (i.e., a new access request) is controlled by the logic circuit 106 of FIG. 4 and is based on the priority of the write request and the status of the pointers 110 and 112. In addition, each exit of an access request (i.e., a read operation) is controlled by the logic circuit 106. A truth table for the control logic within the logic circuit 106 of FIG. 4 is provided below in Table 2 for a cell entry "n", wherein the "previous pointer" represents the cell to the right and the "next pointer" represents the cell to the left. Note that in understanding the operation of the matrix of shifters which preferably comprise the buffer 102, the right most entry (where access requests are read out of the buffer 102) always has its previous pointer tied to logic "0" (shifting in a "0" from the right) and the left most entry has its "next pointer" tied to logic "1" (shifting in a "1" from the left).

TABLE 2

| Write Req | Pri | Next LPWrptr | LPWrPtr | Previous LPWrPtr | Next HPWrPtr | HPWrPtr | Previous HPWrPtr | Read Req | Data Bits |
|---|---|---|---|---|---|---|---|---|---|
| 0 | x | x | x | x | x | x | x | 0 | No Change |
| 1 | 0 | x | 0 | x | x | x | x | 0 | No Change |
| 1 | 0 | x | 1 | 0 | x | x | x | 0 | Write Data |
| 1 | 0 | x | 1 | 1 | x | x | x | 0 | Don't Care |
| 1 | 1 | x | x | x | x | 0 | x | 0 | No Change |
| 1 | 1 | x | x | x | x | 1 | 0 | 0 | Write Data |
| 1 | 1 | x | x | x | x | 1 | 1 | 0 | Shift Left |
| 0 | x | x | x | x | x | x | x | 1 | Shift Right |
| 1 | 0 | 0 | x | x | x | x | x | 1 | Shift Right |
| 1 | 0 | 1 | 0 | x | x | x | x | 1 | Write Data |

TABLE 2-continued

| Write Req | Pri | Next LPWrptr | LPWrPtr | Previous LPWrPtr | Next HPWrPtr | HPWrPtr | Previous HPWrPtr | Read Req | Data Bits |
|---|---|---|---|---|---|---|---|---|---|
| 1 | 0 | x | 1 | x | x | x | x | 1 | No Change |
| 1 | 1 | x | x | x | 0 | x | x | 1 | Shift Right |
| 1 | 1 | x | x | x | 1 | 0 | x | 1 | Write Data |
| 1 | 1 | x | x | x | x | 1 | x | 1 | No Change (n) Write Data (0) |

When the truth table of Table 2 indicates the data bytes within the buffer 102 should shift (either right or left) a ShiftEn signal will go high ("1"), otherwise when "No change" is the proper response, the ShiftEn signal will go low ("0"). In addition, when the control circuit 106 determines that bytes for the $n^{th}$ entry are to shift right, a SL/SR# signal goes low and if a shift left is determined by the control circuit 106, the SL/SR# signal is high. Lastly, when a write operation is to be performed, a WriteEn signal goes high and is otherwise low. The details of the control logic control circuit 106 is not illustrated or described further for the sake of brevity. Such control circuitry, however, may be easily configured by those of ordinary skill in the art and in light of the information provided in Table 2 above.

Figure 8:
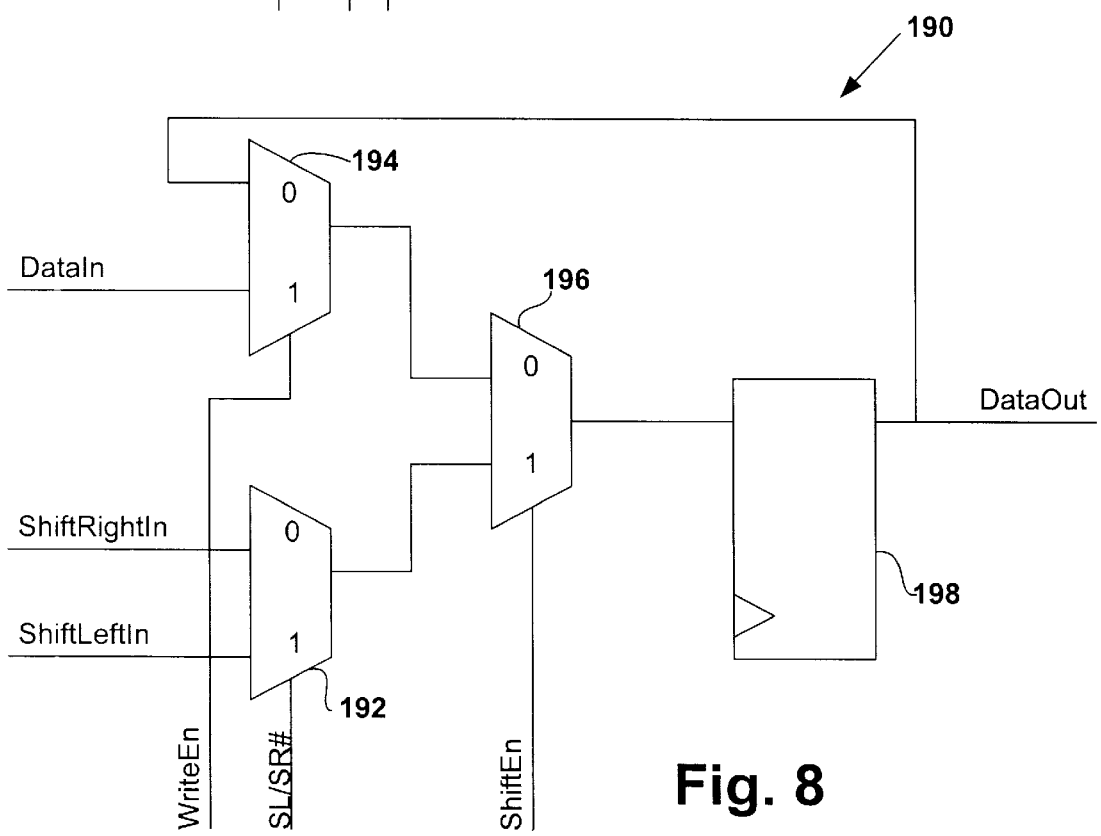
FIG. 8 is a circuit diagram illustrating a data storage cell with associated shifting control circuitry for shifting data in the re-ordering buffer in response to a read operation from the buffer or a write operation to the buffer according to the present invention.

In light of the above control circuit functionality, the operation of an $n^{th}$ cell 190 within the matrix of shifting elements will be described in conjunction with FIG. 8. The cell 190 includes three multiplexers 192, 194 and 196, respectively and a D-type latch 198. The first multiplexer 192 has two inputs which form ShiftRightIn and ShiftLeftIn terminals for the cell 190. The ShiftRightIn terminal is coupled to the DataOut terminal of the cell immediately to its left (i.e., cell "n+1") and the ShiftLeftIn terminal is coupled to the DataOut terminal of the cell immediately to its right (i.e., cell "n−1"). The first multiplexer 192 is controlled by the SL/SR# signal and thus controls whether the data within a cascade of cells similar to cell 190 shift to the left (to allow room for a new, higher priority access request) or to the right (in response to an access request being executed).

The second multiplexer 194 has one input coupled to the DataOut of the cell 190 and a second input which is the DataIn terminal and is coupled to the control circuit 106 of FIG. 4. When a new access request is to be written to the buffer 102, the appropriate bit of the new access request is transmitted to the element 190 through the DataIn terminal. The second multiplexer 194 is controlled by the WriteEn signal. Thus when the control circuit 106 wishes to write a new access request to the buffer 102, WriteEn goes high and passes the value on the DataIn terminal to the third multiplexer 196. Otherwise, the present value of the cell (DataOut) is passed.

The third multiplexer 196 receives as inputs the outputs of the first and second multiplexers 192 and 194, respectively. The third multiplexer 196 is controlled by the ShiftEn signal. Thus, if the control circuit 106 dictates that data must be shifted to the left to accommodate a new access request having a higher priority, the SL/SR# signal and the ShiftEn signal go high and the value at ShiftLeftIn (the value in the element located to the right (n−1)) is passed to the latch 198. Similarly, if the elements are to shift to the right due to the execution of an access request, the value at ShiftRightIn is passed to the latch 198.

When the control signal to the third multiplexer 196 (ShiftEn) is low, the third multiplexer 196 selects the output of the second multiplexer 194. In this mode either the same data value is maintained ("no change") or a data bit associated with a new access request from DataIn is passed to the third multiplexer 196.

Figure 9:
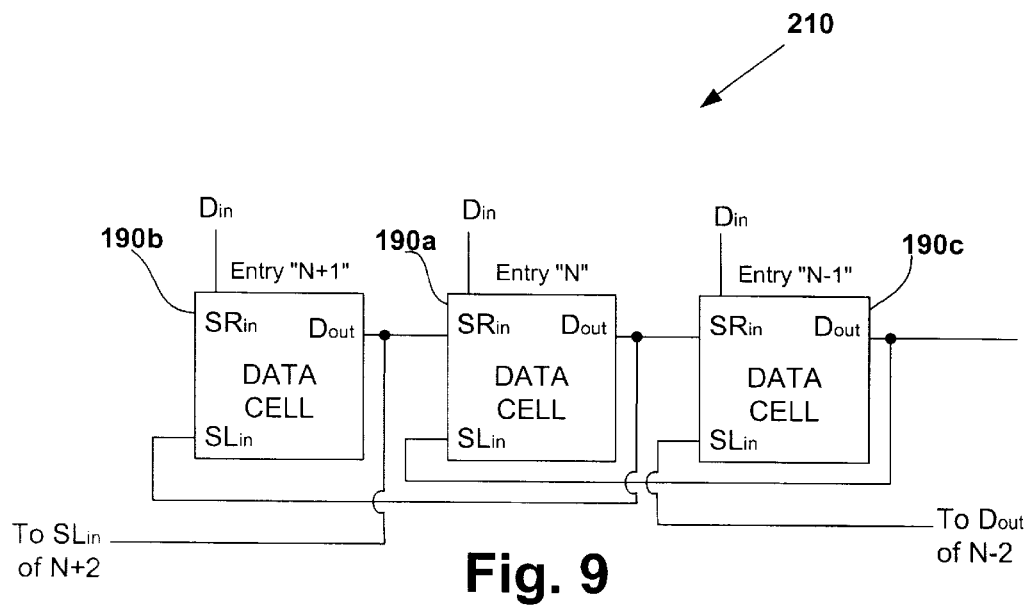
FIG. 9 is a block diagram illustrating an interconnection of data storage cells in the re-ordering buffer according to the present invention.

As discussed supra, data is passed from one element within the matrix of elements to another to re-order access requests within the buffer. Note that the element 190 of FIG. 8 represents only a single cell within the matrix which makes up the buffer 102. To better understand the operation of the cell 190 in context, FIG. 9 represents a circuit 210 of cascaded elements 190a–190c, respectively. In FIG. 9, element 190a represents the $n^{th}$ cell, wherein elements 190b and 190c represent cells (n+1) and (n−1), respectively. Note that in the cascade arrangement, the cells represent an individual data bit for three different access requests. Since access requests preferably consist of multiple bit words, the arrangement illustrated in FIG. 9 is preferably extended in a two-dimensional matrix.

The DataOut of cell 190a ($D_{out}$) is coupled to the ShiftRightIn ($SR_{in}$ in FIG. 9 for simplicity) of the cell 190c to the right and to the ShiftLeftIn ($SL_{in}$ in FIG. 9) of the cell 190b to the left. As discussed above with regard to FIG. 8, the data bits are shifted to the left or right as specified by the control circuit 106 to re-order or execute access requests. New access requests may be input to any one of the three cells 190a–190c through the DataIn ($D_{in}$) terminals as specified by the control circuit 106, thus allowing for a dynamic allocation of new requests into the buffer 102 based on the priority of the new request.

Figure 10:
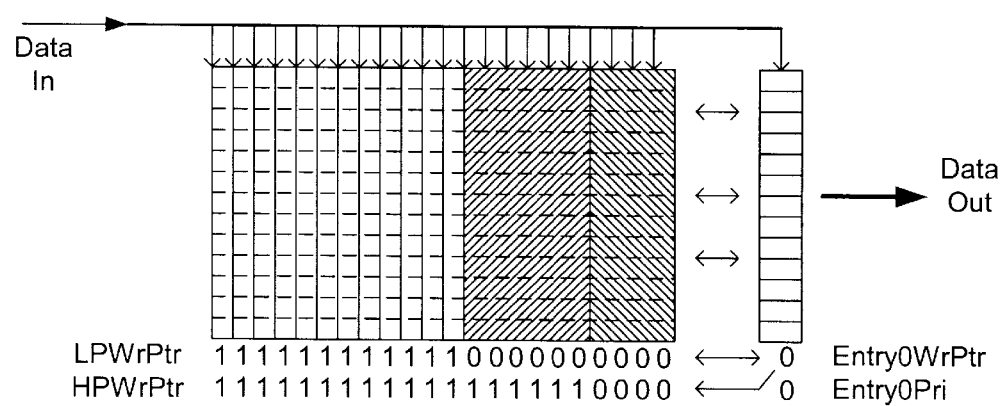
FIG. 10 is a block diagram illustrating a re-ordering buffer or FIFO according to another embodiment of the present invention.

In some circuit designs, there is a desire for an access request at position or entry "0" in the buffer 102 (i.e., the position in the buffer 102 in which the access request is next in line to be executed) to remain stable. Therefore in such a design, regardless of the priority of a new, incoming access request, the request at position "0" will not change. The system 220 of FIG. 10 illustrates the buffer 102 having this unique control methodology, wherein a single pointer 222 exists for entry "0" in the buffer 102. Note that the buffer 102 of FIG. 10 is the same as the buffer 102 of FIG. 5, wherein FIG. 10 illustrates entry "0" separate from the buffer 102 solely for illustration purposes. In system 220, entry "0" has a single pointer bit (e.g., Entry0WrPtr) instead of one pointer bit per priority which exist for the remaining entry positions 1, 2, . . . n. In addition, entry "0" has a bit that indicates the priority of the access request which resides within the entry (Entry0Pri, wherein "1" indicates a high priority request and a "0" indicates a low priority request).

In operation, the value within the Entry0WrPtr gets shifted into both the low priority and the high priority pointers 110 and 112, as illustrated in FIG. 10. Thus the pointer for entry "0" is used as the "shift-in" for both the high priority and the low priority pointers for entry "1". The priority bit and the value within entry "0" follow the truth table illustrated in Table 3 below.

TABLE 3

| FifoWr | Pri | FifoRd | Entry0WrPtr | Entry0Pri | Entry0Data |
|--------|-----|--------|-------------|-----------|------------|
| 0 | x | 0 | x | No Change | No Change |
| 1 | x | 0 | 0 | No Change | No Change |
| 1 | 1 | 0 | 1 | Write Pri | Write Data |
| x | x | 1 | x | Shift Right | Shift Right |

As can be seen from Table 3, when a write operation occurs to the buffer 102 when a stable entry exists within entry "0", no change occurs in the Entry0Data, regardless of the priority of the new access request. Instead, an access request is only written to Entry "0" when the buffer 102 is empty (i.e., Entry0WrPtr=1). A detailed description of the logic used to effectuate the results of the above truth table are omitted for the sake of brevity. It is understood, however, that one of ordinary skill in the art could easily construct such logic circuitry given the discussion and truth table above.

Figure 11:
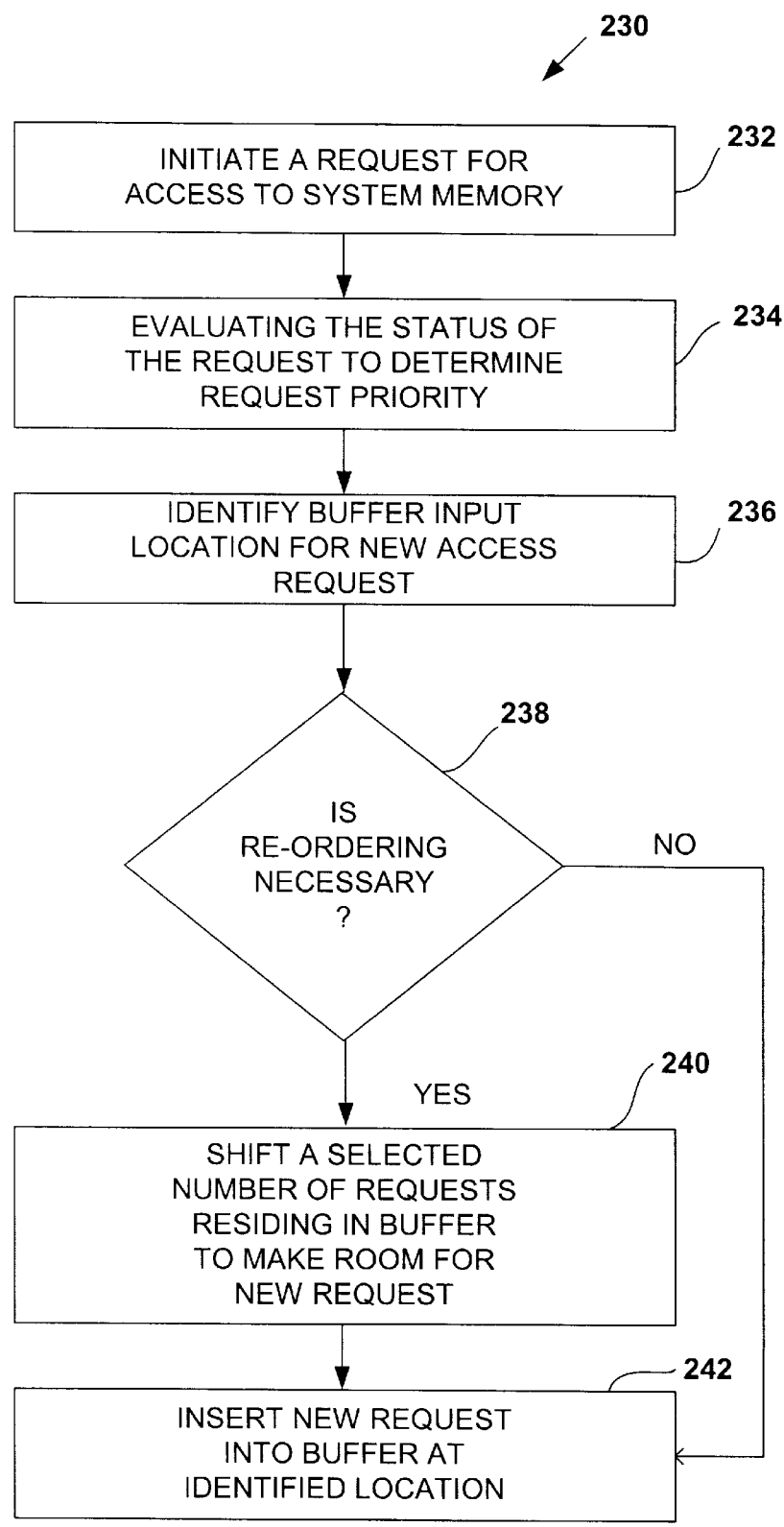
FIG. 11 is a flow chart diagram illustrating a method of ordering an access request to a system memory in a buffer according to the present invention.

As discussed above in conjunction with FIGS. 4–10, the present invention includes a system for re-ordering a buffer used to store access requests to a system memory. In addition, the present invention can also be characterized broadly as a method of ordering access requests in a FIFO or buffer. Such a method 230 is illustrated in the flow chart of FIG. 11. The method 230 begins with the initiation of a request to access the system memory 14 at step 232. The request is typically initiated by the graphics controller 22 and sent to the core logic 18. The core logic 18, preferably via the control circuit 106 of FIG. 4, then evaluates the request to determine whether it is a high or low priority request at step 234. The evaluation step 234 may include, for example, evaluating the state of a priority bit. Other evaluation method, however, may alternatively be employed and are contemplated as falling within the scope of the present invention.

Once the priority of the new access request is determined at step 236, the appropriate position or input location within the buffer 102 is identified at step 238. Preferably, step 238 is accomplished using or more sets of pointers 110 and 112, as illustrated in FIG. 5. Alternatively, other methods or circuits may be utilized to identify the input position based on the priority of the access request and such alternatives are contemplated as falling within the scope of the present invention. Based on the input location identification at step 236, a query is made whether a re-ordering of the buffer 102 is necessary at step 238. Preferably, this query is performed by the control circuit 106 within the core logic 18.

If re-ordering is necessary (YES), a selected number of requests, preferably associated with lower priority access requests, are shifted within the buffer 102 to make room for the new request at step 240. Although the step of re-ordering is preferably based on the priority of the access request, other criteria may be utilized and ordering within the buffer 102 may be implemented based on those alternative criteria. The new request is then inserted into the identified location within the buffer 102 at step 242. In the event that re-ordering of the buffer 102 is not necessary to place the new request within the buffer 102 (NO at step 238), the method 230 continues to step 240 in which case the new access request is inserted into the buffer 102.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A system for ordering a request for access to a system memory, comprising:

a re-ordering buffer having a data input and a data output;

an input request position identifier associated with the re-ordering buffer, wherein the input request position identifier indicates a position of the data input in the re-ordering buffer for the new request based on a status of the request; and a control circuit operatively coupled to the re-ordering buffer, wherein the control circuit is configured to maintain a position of an access request within the re-ordering buffer when the access request resides at a position within the re-ordering buffer in which the access request is the next access request to be serviced from the re-ordering buffer regardless of its status and regardless of a status of a new access request being transferred to the re-ordering buffer.

2. The system of claim 1, wherein the buffer comprises an arbitrating FIFO.

3. The system of claim 1, wherein the system re-orders write requests to write data to the system memory and the input request position identifier comprises a low priority write pointer, wherein the low priority write pointer points to a data input position in the re-ordering buffer, and wherein a low priority write request is written to the data input position and will be executed by the system after high priority write requests are executed and earlier requested low priority write requests are executed.

4. The system of claim 1, wherein the system re-orders write requests to write data to the system memory and the input request position identifier comprises a high priority write pointer, wherein the high priority write pointer points to a data input position in the re-ordering buffer, and wherein the a high priority write request is written to the data input position and will be executed by the system after earlier requested high priority write requests are executed and before low priority write requests are executed.

5. The system of claim 1, wherein the system re-orders write requests in the re-ordering buffer, wherein the write requests are requests to write data to the system memory, and wherein the input request position identifier comprises:

a low priority write pointer, wherein the low priority write pointer points to a first data input position in the re-ordering buffer, and wherein the write request which is written to the first data input position will be executed by the system after high priority write requests are executed and earlier requested low priority write requests are executed; and a high priority write pointer, wherein the high priority write pointer points to a second data input position in the re-ordering buffer, and wherein the write request which is written to the second data input position will be executed by the system after earlier requested high priority write requests are executed and before low priority write requests are executed.

6. The system of claim 1, wherein the system re-orders read requests to read data from the system memory and the input request position identifier comprises a low priority read pointer, wherein the low priority read pointer points to a data input position in the re-ordering buffer, and wherein a low priority read request is written to the data input position and will be executed by the system after high priority read requests are executed and earlier requested low priority read requests are executed.

7. The system of claim 1, wherein the system re-orders read requests to read data from the system memory and the input request position identifier comprises a high priority read pointer, wherein the high priority read pointer points to a data input position in the re-ordering buffer, and wherein a high priority read request is written to the data input position and will be executed by the system after earlier requested high priority read requests are executed and before low priority read requests are executed.

8. The system of claim 1, wherein the system re-orders read requests in the re-ordering buffer, wherein the read requests are requests to read data from the system memory, and wherein the input request position identifier comprises:

a low priority read pointer, wherein the low priority read pointer points to a first data input position in the re-ordering buffer, and wherein the read request which is written to the first data input position will be executed by the system after high priority read requests are executed and earlier requested low priority read requests are executed; and a high priority read pointer, wherein the high priority read pointer points to a second data input position in the re-ordering buffer, and wherein the read request which is written to the second data input position will be executed by the system after earlier requested high priority read requests are executed and before low priority read requests are executed.

9. The system of claim 1, wherein the request comprises one of writing data to the system memory or reading data from the system memory.

10. The system of claim 1, wherein the input request position identifier comprises a shift register containing data indicative of a position of high priority requests in the re-ordering buffer or a position of low priority requests in the re-ordering buffer.

11. The system of claim 10, wherein the data indicative of a position comprises a first binary value at one or more positions where access requests reside and a second binary value at one or more positions where access requests do not reside.

12. The system of claim 1, wherein the status of the request comprises high priority or low priority.

13. A computer system having an accelerated graphics port platform including a graphics controller, a processor, a system memory and a core logic circuit which includes an arbitrating FIFO circuit, wherein the arbitrating FIFO circuit comprises:

an arbitrating FIFO having a data input and a data output;

an input request position identifier associated with the arbitrating FIFO, wherein the input request position identifier indicates a position of the data input in the arbitrating FIFO for a request for access to the system memory based on a status of the request; and a control circuit operatively coupled to the arbitrating FIFO, wherein the control circuit is configured to maintain a position of an access request within the arbitrating FIFO when the access request resides at a position within the arbitrating FIFO in which the access request is the next access request to be serviced from the arbitrating FIFO regardless of its status and regardless of a status of a new access request being transferred to the arbitrating FIFO.

14. The computer system of claim 13, wherein the system memory contains texture data for three dimensional graphics, and wherein the graphics controller issues the request for access to the system memory to write texture data to the system memory or read texture data from the system memory.

15. The computer system of claim 13, wherein the input request position identifier comprises a pointer which points to a location in the arbitrating FIFO for inputting the request for access to the system memory, and wherein the location is a function of the status of the request.

16. The computer system of claim 13, wherein the status of the request for access to the system memory is high priority or low priority.

17. The computer system of claim 13, wherein the input request position identifier comprises a pair of shift registers, wherein a first shift register indicates the position of the data input for a low priority request for access to the system memory and a second shift register indicates the position of the data input for a high priority request for access to the system memory.

18. The computer system of claim 17, wherein digital data within the pair of shift registers form two words, and wherein the words indicate the locations for the low priority and high priority requests, respectively.

19. The computer system of claim 18, wherein the two words change in response to a request entering or exiting the arbitrating FIFO.

20. The computer system of claim 13, wherein the arbitrating FIFO has N available regions for entry of a request for access to the system memory, and wherein each of the N regions is M bits wide, and wherein an access request within the FIFO shifts to an adjacent location within the FIFO in response to another access request entering or exiting the FIFO.

21. The computer system of claim 20, wherein the access request within the FIFO has a first priority and shifts in one direction to exit the FIFO or when another access request exits the FIFO and in another direction to accommodate a new access request having a second priority which is greater than the first priority.

22. A method of ordering a request for access to a system memory in a buffer, comprising the steps of:

initiating a request for access to the system memory, wherein the request has a status indicating a priority of the request;

evaluating the status of the request to determine whether the request is a high priority request or a low priority request;

identifying a location within the buffer for inputting the access request in response to the evaluation;

shifting one or more previously requested access requests within the buffer if necessary to make room for the access request at the identified location unless one of the previously requested access requests resides at a position within the buffer in which the access request will be a next access request to be serviced from the buffer, in which case the one access request which will be the next access request to be serviced is not shifted while the remaining one or more previously requested access requests will be shifted if necessary to make room for the access request at another identified location;

inserting the access request into the buffer at the identified location if none of the previously requested access requests reside at the position within the buffer in which the access request will be the next access request to be serviced from the buffer; and inserting the access request into the buffer at the another identified location if the one of the previously requested access requests does reside at the position within the buffer in which the access request will be the next access request to be serviced from the buffer.

23. The method of claim 22, wherein shifting previously requested access requests if necessary comprises the steps of:

determining whether the priority of the access request is greater than the priority of one or more of the access requests that reside in the buffer; and shifting the access requests which reside in the buffer having a lower priority than the access request.

* * * * *

UNITED STATES PATENT AND TRADEMARK OFFICE
CERTIFICATE OF CORRECTION

PATENT NO. : 6,253,262 B1
DATED : June 26, 2001
INVENTOR(S) : Ranjit J. Rozario, Scott Waldron, Ravikrishna Cherukuri Page 1 of 1

It is certified that error appears in the above-identified patent and that said Letters Patent is hereby corrected as shown below:

Column 1,
Line 14, please replace the word "application" with -- applications --.

Column 5,
Line 39, please replace the phrase "Fig. 5 is block" with the phrase -- Fig. 5 is a block --.

Column 8,
Line 7, please replace the word "nth" with -- $n^{th}$ --.

Column 11,
Line 35, please replace the word "method" with -- methods --.
Line 41, please replace the phrase "using or" with the phrase -- using one or --.

Column 12,
Lines 50 & 51, please replace the phrase "and wherein the a high priority" with the phrase -- and wherein a high priority --.

Signed and Sealed this

Nineteenth Day of February, 2002

*Attest:*

*Attesting Officer*

JAMES E. ROGAN
*Director of the United States Patent and Trademark Office*